US007162802B2

(12) United States Patent
Benardeau et al.

(10) Patent No.: US 7,162,802 B2
(45) Date of Patent: Jan. 16, 2007

(54) HAND TOOL

(75) Inventors: Anne-Laure Benardeau, 6 rue Dupuis 75003, Paris (FR) 75001; Jean Grenier, Clichy (FR)

(73) Assignee: Anne-Laure Benardeau, Paris (FR)

( * ) Notice: Subject to any disclaimer, the term of this patent is extended or adjusted under 35 U.S.C. 154(b) by 0 days.

(21) Appl. No.: 10/428,121

(22) Filed: May 2, 2003

(65) Prior Publication Data

US 2003/0204914 A1 Nov. 6, 2003

(30) Foreign Application Priority Data

May 3, 2002 (EP) ................................. 02291126

(51) Int. Cl.
*A47J 43/28* (2006.01)
*B25G 3/00* (2006.01)
*B25B 23/16* (2006.01)

(52) U.S. Cl. ........................... 30/147; 30/340; 30/329; 81/438; 81/439; 81/489; 81/177.1; 16/422; 403/DIG. 1

(58) Field of Classification Search .................. 30/340, 30/329, 332, 147, 322, 324; 403/DIG. 1, 403/13, 14, 361; 81/438, 439, 177.1, 489; 16/422, 427
See application file for complete search history.

(56) References Cited

U.S. PATENT DOCUMENTS 2,105,119 A * 1/1938 Hindes ........................ 30/340
2,130,661 A * 9/1938 Zaebst ......................... 30/340
2,697,642 A 12/1954 Rudy
2,921,326 A * 1/1960 Lautmann .................... 16/422
3,516,697 A * 6/1970 Hahn .......................... 403/118
3,742,602 A * 7/1973 Brumwell .................... 30/340
4,821,417 A * 4/1989 Levine ........................ 30/324
5,327,612 A * 7/1994 Kelsay .................. 16/DIG. 18
5,355,544 A * 10/1994 Dirksing .................... 15/167.1
5,603,248 A 2/1997 Eggert et al.
5,816,337 A * 10/1998 Kun-Chuan .................. 16/422
5,950,280 A * 9/1999 Taylor ......................... 16/422
6,016,728 A * 1/2000 Bohl ........................... 81/438
6,048,073 A * 4/2000 Shiao .......................... 81/451
6,513,199 B1 * 2/2003 Cheng ......................... 16/422
6,675,483 B1 * 1/2004 Bond et al. ................... 30/340
6,854,919 B1 * 2/2005 Neumann et al. ............. 16/422
2002/0092181 A1 * 7/2002 Choi ........................... 30/324

FOREIGN PATENT DOCUMENTS

DE 24 26 810 A1 3/1976
DE 24 26 884 A1 3/1976

* cited by examiner

*Primary Examiner*—Timothy V. Eley
*Assistant Examiner*—Jason Prone
(74) *Attorney, Agent, or Firm*—Rothwell, Figg, Ernst & Manbeck

(57) ABSTRACT

A hand tool is formed of a handle and a removable tool part . The tool has a protruding section and a first magnet at the end of the protruding section. The handle has a bore with a second magnet. The tool is assembled by inserting the protruding section into the bore so that the first magnet contacts the second magnet. Ramps are provided on the tool part and handle; the tool is disassemble by rotating the tool part relative to the handle. Thanks to the ramps, the magnets are separated : the tool part and the handle may then be pulled apart.

6 Claims, 7 Drawing Sheets

HAND TOOL

BACKGROUND OF THE INVENTION

1. Field of the Invention

The invention relates to the field of hand tools, and more specifically to tableware and flatware.

2. Description of the Related Art

The invention concerns also tools and do-it-yourself.

Tableware articles—forks, knives, spoon and the like—are integral devices. Some are moulded out of metal; other comprise a plastic handle moulded a metal tool.

There is a need for a hand tool, that could provide interchangeability to such hand tools.

BRIEF SUMMARY OF THE INVENTION

In one embodiment, the invention provides a hand tool comprising a handle and a removable tool part, one of which is provided with a protruding section and a first magnet, the other of which is provided with a bore adapted to receive the protruding section and with a second magnet adapted to contact, or with a very light air gap, the first magnet when the protruding section is received into the bore.

Preferably, the magnetic force of the contacting magnets is higher than 10 N and is lower than 100 N.

In one embodiment, the protruding section and the bore have a circular cross section.

At least one from the handle and tool part may be provided with a ramp.

In one embodiment the ramp is adapted to allow the magnets to contact in one annular position of the tool part relative to the handle.

The bore may be provided with an inner sheath. Preferably, the second magnet is within the sheath.

The tool part is for example one of a spoon, fork and knife.

In another embodiment, the invention provides a tableware handle, having at one end a bore, a magnet within the bore or without sheath typical and a ramp.

Preferably the bore has a circular cross section. The bore may be provided with an inner sheath. The second magnet may be within the sheath.

The invention provides also a tableware tool part, having at the end opposite the tool part a protruding section and a magnet. Preferably, the magnet is located within a bore at the end of the protruding section. The bore has for example a circular cross section. The tool part may further comprise a ramp.

BRIEF DESCRIPTION OF THE SEVERAL VIEWS OF THE DRAWINGS

Other features and aspects of the invention will appear upon reading of the following description of the preferred embodiments, in conjunction with the accompanying drawings, in which.

DETAILED DESCRIPTION OF THE INVENTION

The invention suggests using a two-parts assembly for a hand tool, comprising a handle and a tool part. The two parts may be disassembled or re-assembled at wish, thanks to a magnet-based lock.

Figure 1:
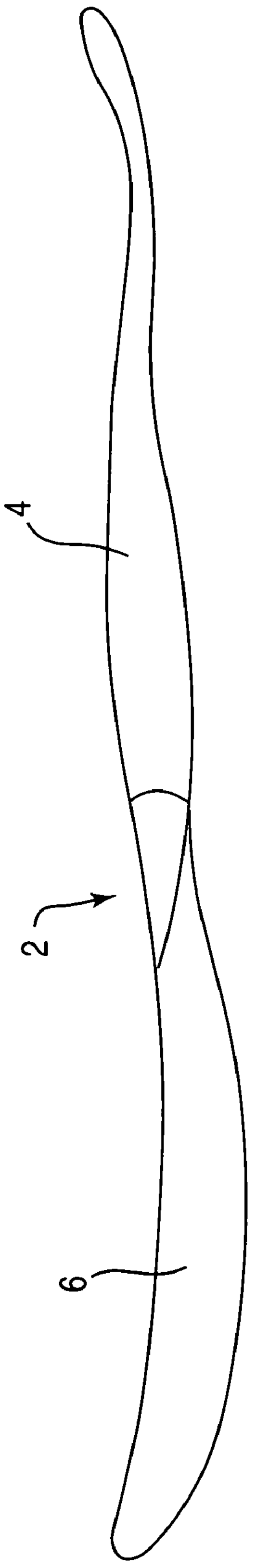
FIG. 1 shows a schematic view of a hand tool according to the invention.

FIG. 1 shows a schematic view of a hand tool 2 according to the invention; in the example, the tool is a knife. It is represented on FIG. 1 in its assembled state; in this state, the hand tool is similar to a tool of the prior art. The hand tool comprised a handle 4, which is shaped for allowing it to be seized or held by the user of the hand tool. As discussed below, the handle may be made of metal, plastic or any other material; in the example of FIG. 1, the handle is made of a moulded plastic material, such as polyresin, or of wood, silver, resin/teak alloy. The handle may also be machined. The hand tool further comprises a tool part 6, which in the example of FIG. 1 is the blade of the knife. In the case of a knife, the tool is made of metal, e.g. stainless steel. It could also be made of ceramics or of another material.

Figure 6:
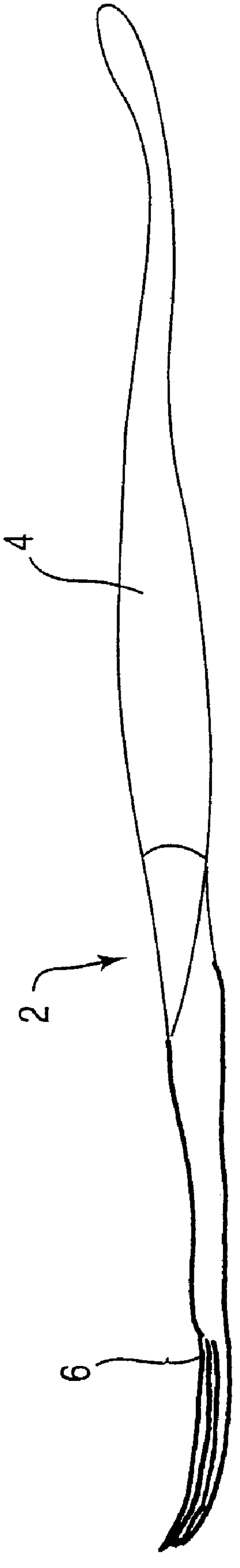
FIGS. 6–7 respectively show a fork and a spoon in accordance with embodiments of the present invention.
Figure 7:
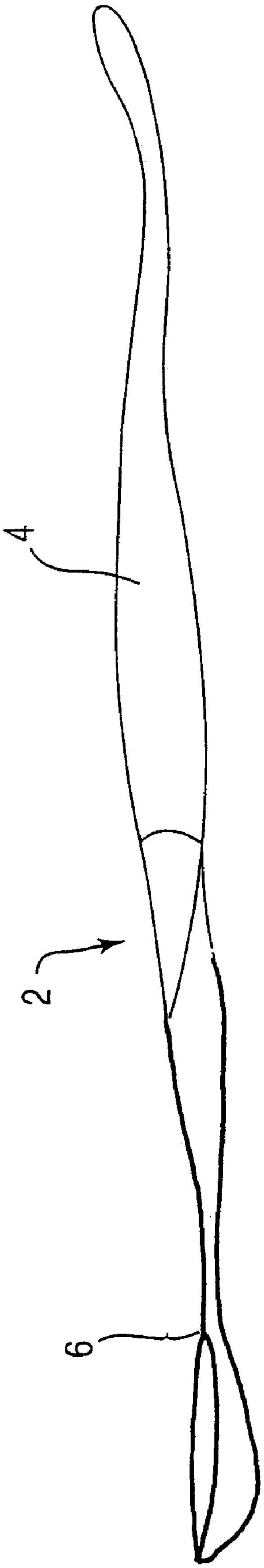

FIGS. 6–7 show schematic views of hand tool 2 in the examples of a fork and spoon respectively.

Figure 2:
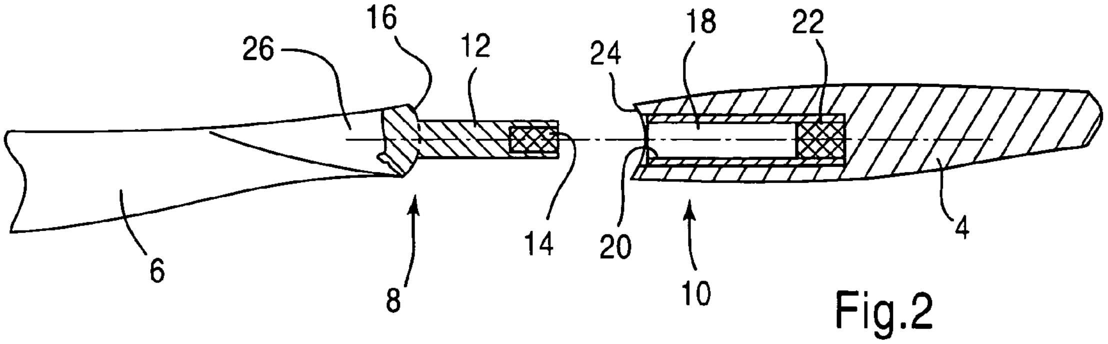
FIG. 2 shows a partial cross section of the tool of FIG. 1, in a disassembled state.

FIG. 2 shows a partial cross section of the tool of FIG. 2, in a disassembled state. The cross section is taken along the axis of the hand tool. The tool part 6 has an assembling end 8 designed to mate with an assembling end 10 of the handle for assembling the tool. As shown on FIG. 2, the assembling end 8 of the tool part has a protruding section 12, which is substantially circular in cross section. At its end opposite to the tool parts, the protruding section is provided with a first magnet 14. At the other end of the protruding section, where it merges with the rest of the tool part, the tool part is provided with a first ramp 16; the use of this ramp is discussed below.

The assembling end 8 of the handle is provided with a circular bore 18 for receiving the protruding section 12 of the tool part. In the embodiment of FIG. 2, this bore is further provided with an inner sheath 20 covering the inner wall of the opening. A second magnet 22 is provided in the end of the bore. The second magnet also lies within the sheath 20, which is preferred for the reasons discussed below. At its end, proximate the opening of the bore 18, the handle is also provided with a second ramp 24. The shape of the second ramp matches the shape of the first ramp 16.

The hand tool of FIGS. 1 and 2 may be disassembled or assembled as explained now. For assembling the hand tool, the protruding section 12 of the tool part 6 is inserted into the opening of the bore 18 and is pushed toward the handle, along their common axis 26. The first magnet thus enters the bore and approaches the second magnet. At the same time the first ramp 16 contacts the second ramp 24. Unless the angular arrangement of the tool part relative to the handle, around the axis 26, is the contemplated one, the first and second ramp contact, but their shape do not match. This ensures that the first magnet does not contact the second magnet, unless the annular position of the tool part relative to the handle is a preselected position, or one of preselected positions. The first and second ramps therefore ensure a precise annular assembly of tool part 6 and handle 4. An airgap between the first magnet 14 and the second magnet 22 is at most 1 mm.

If the annular position of the tool part and handle is correct, the first and second ramps mate, so that the first magnet 14 contacts the second magnet 22. The tool is then assembled. In this assembled state, the tool appears integral to the user and may be used as any tool of the prior art. The first and second magnets lock the tool part and the handle in the axial direction, and prevent any axial movement. Any torque caused by using the tool 2 is transmitted from the tool part 6 to the handle 4 through the protruding part 12 and the bore 18 with its sheath 20. This assembly makes it possible to exert a high torque on the tool, without any risk that it disassembles.

Figure 3:
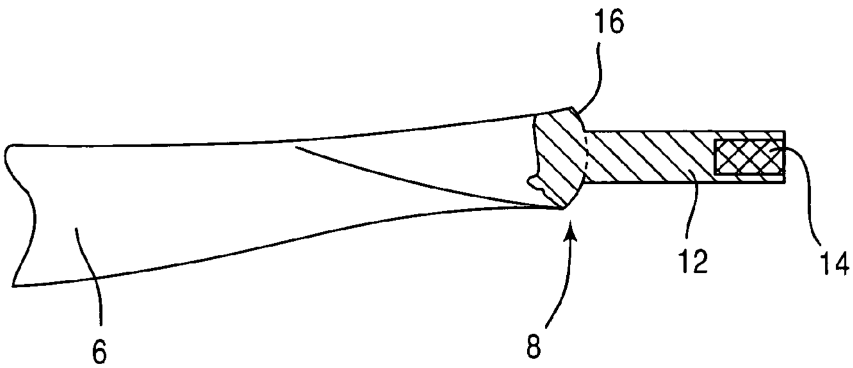
FIG. 3 shows an enlarged view of one end of the tool part of the hand tool of FIG. 1.

For disassembling the tool, the tool part 6 is rotated around axis 26, relative to the handle. Since the first and second ramps are angled and not strictly perpendicular to the axis, rotation of the tool part relative to the handle causes an axial displacement of the protruding part inside of the bore. The first and second magnet as therefore separated one from the other. Once the magnets are separated, the magnetic force decreases strongly, so that the handle and tool part may be separated easily, by simply pulling them apart. Thus, the first and second ramps make it possible to easily disassemble the tool, by causing axial displacement of the protruding section within the bore when the tool part is rotated relative to the handle. FIG. 3 is an enlarged view of the assembling end 8 of the tool part. The features discussed above are not described again. FIG. 3 shows that the first ramp 16 on the tool part is saddle-shaped. This provides a smooth and continuous transition from the tool part to the handle. The first ramp is not symmetric, so that there is only one annular position for assembling the tool on the handle. The maximum angle between the first ramp and a plane perpendicular to the axis 26 of the protruding part is between 5° and 45°; in the example, it is around 25°. For a given distance between the axis and the ramp, the rate between the torque exerted on the tool part and the force axial force is proportional to the tangent of this angle. The angle may therefore be adapted to the strength of the magnets and to the annular torque deemed necessary for separating the tool. The proposed angle range ensures that the rate is between 30° and 45°.This is adapted to the magnet strength around 16 N discussed below.

In the embodiment of FIG. 3, the tool part is made of metal. One may select any kind of metal, of the type used in tableware, such as stainless steel, silver, silver-plated, Zamak or the like. The metal is preferably amagnetic, so that the tool is not magnetised. The tool part may also be formed of several materials.

Should this prove necessary, the protruding section may comprise an outer sheath. This may be helpful in providing a limited play between the protruding part and the bore in the handle. It may also be of help in case the material used for the tool part is not easily workable, e.g. for a moulded ceramic tool part.

The first magnet is located in a bore 28 at the free end of the protruding section 12. It is maintained in this bore by any appropriate method, e.g. by gluing with an epoxy glue. The magnet could also be forced into the bore. The only limit to such a force assembly is the actual capability of the magnet to resist crushing. With a magnet compression strength in the usual range of 900 $N/mm^2$ or higher, this type of force assembly is possible. If a sheath were provided also over the protruding section, the magnet could be mounted within the sheath.

Figure 4:
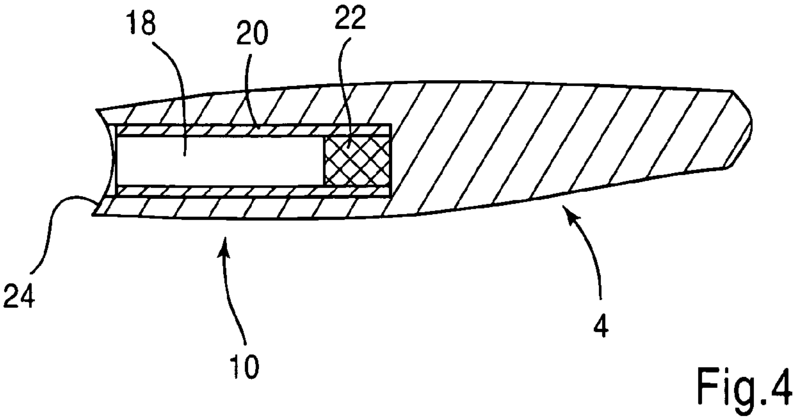
FIG. 4 shows an enlarged view of the assembly end of the handle of the hand tool of FIG. 1.
Figure 5:
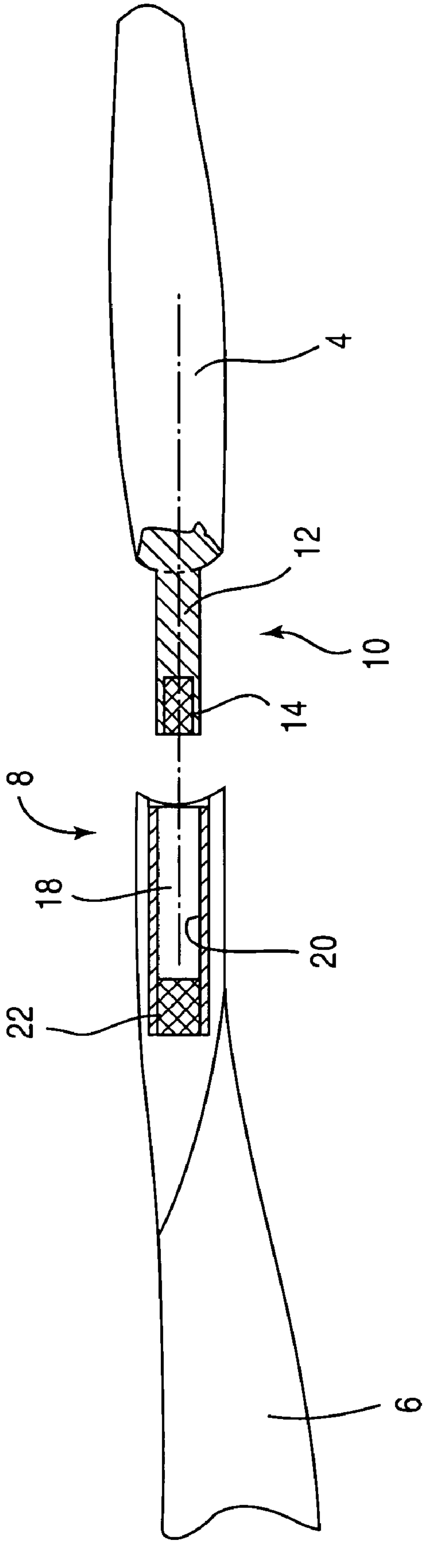
FIG. 5 shows a tool part with the bore and the tool handle having a protruding section.

FIG. 4 is an enlarged view of the assembling end 10 of the handle. The features discussed above as not described again. FIG. 4 shows sheath 20, as well as second magnet 22. The fact that the second magnet 22 is located within the sheath makes it easier to mount the handle. Indeed, the second magnet is first fixed within the sheath—e.g. by gluing or by forcing the magnet into the sheath. The assembly of the sheath and magnet is then fixed to the handle. Since the magnet is fixed to the sheath, the assembly of the sheath and magnet may be forced into the handle, with a compression force higher than the compression strength of the magnet. The fact that the magnet is fixed within the sheath also ensures that the magnet is precisely positioned within bore 18.

The sheath is preferably made of amagnetic metal, for example stainless steel. This ensures magnetic hysteresis loop of the two magnets.

The first and second magnet may be rare earth magnets, e.g. magnets of the type sold by Isolectra Martin, under reference NEODYNE 6×6. They cause an axial strength of 16 N. This value was found to be sufficient for ensuring that the tool remains assembled in use. More generally, one could use a magnetic strength between 10 and 100 N. The lower value of this range ensures that the tool remains assembled. The higher value ensures that is remains possible to disassemble the tool, thanks to the ramps, without using additional specific tooling.

Exemplary dimensions of the assembling ends are now provided. These dimensions were found appropriate for tableware. They allow the invention to be embodied in forks, knives and spoons of any usual size—e.g. tea spoons as well as table spoons.

length of protruding section: about 24 mm;
outer diameter of protruding section: 7 mm;
diameter of first magnet: 6 mm;
length of first magnet: 6 mm;
thickness of sheath: 0,5 to 1 mm;
floating between protruding section and sheath: 0,1 to 0,2 mm.

Figure 8:
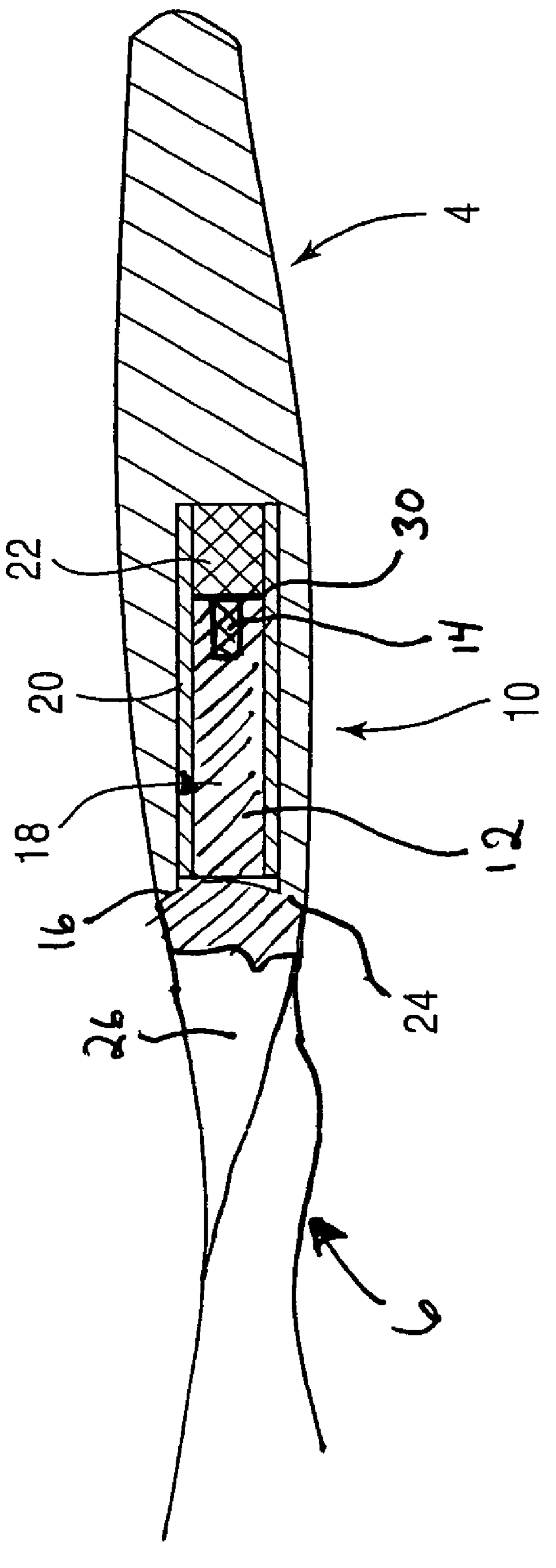
FIG. 8 shows an assembled tool.
Figure 9:
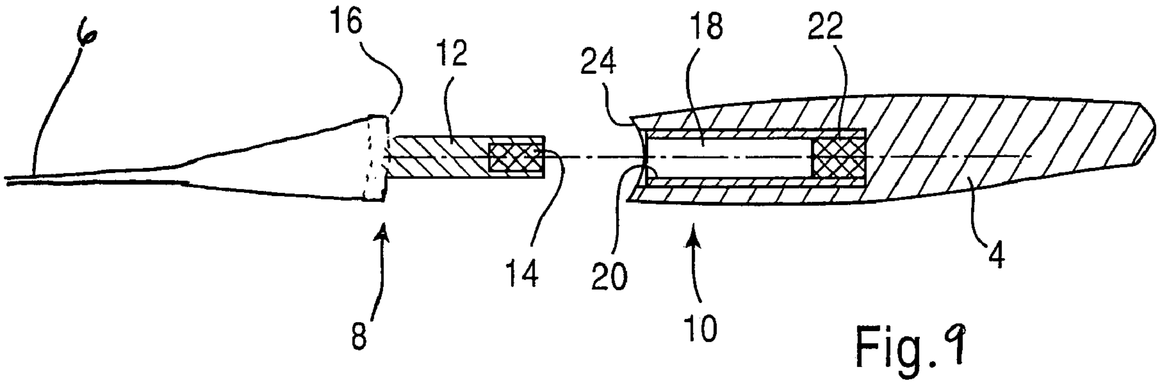
FIG. 9 shows a partial cross section of the tool of FIG. 2, in a different radial position.

FIG. 8 shows an assemble portion of hand tool 2. As described above, the protruding section 12 is inserted into the bore 18, and when the ramp 16 of the tool part matches the ramp 24 of the handle part, the magnet 14 contacts or substantially contacts, with an air gap 30 therebetween, the magnet 22.

The invention makes it possible to offer several handles for a given tool. The handles may be adapted to the users, or may have different shapes or appearances.

The invention is not limited to the embodiments discussed and disclosed. In the tool part, the magnet 14 is not necessarily at the end of the protruding section 12. It could lie along the protruding section, thereby at the same time guiding the protruding part and ensuring the locking effect.

In the embodiment discussed above, annular positioning of the tool part relative to the handle is ensured by the ramp. The ramp also eases disassembling of the hand tool. The annular positioning could be ensured by shaping the protruding section and the bore, e.g. with a triangular cross-section. In this case, there is no need to provide a ramp. However, disassembling the hand tool is then more difficult since it requires overcoming the attraction of the magnets when pulling apart the tool part and the handle.

In the example of FIG. 2, an inner sheath is provided in bore 18 and no sheath is provided for protruding section 12. One could use a sheath on the protruding section; one could also dispense from sheath 20, e.g. where the handle is made of metal. If an outer sheath is provided on the protruding section, the second magnet could lie within this sheath when the tool is assembled.

The protruding section is on the tool part, while the bore is provided in the handle. This is especially appropriate for tableware; one may also provide the bore in the tool part and the protruding section in the handle.

The invention claimed is:

1. A hand tool comprising:

a handle having a first ramp; and a removable tool part having a second ramp;

wherein one of the handle and tool part is provided with a protruding section and a first magnet, wherein the other of the handle and tool part is provided with a bore adapted to receive the protruding section and with a second magnet wherein the protruding section and the bore have a circular cross section and wherein the shapes of the first ramp and the second ramp are adapted to allow the first magnets to contact, or substantially contact with an air gap less than or equal to approximately 1 mm, the second magnet, when the protruding section is received into the bore and the tool part is in a first annular position relative to the handle, and to not contact or to not substantially contact when the tool part is in a second annular position relative to the handle;

wherein the first and second annular positions are measured about a center axis of said protruding section and said bore, the shapes of the first and second ramps do not match with each other in the second annular position.

2. The tool of claim 1, wherein the magnetic force of the contacting magnets is higher than 10 N.

3. The tool of claim 1, wherein the magnetic force of the contacting magnets is lower than 100 N.

4. The tool of claims 1, wherein the tool part is one of a spoon, fork, knife, or another tableware tool.

5. The tool of claims 1, wherein the bore is provided with an inner sheath.

6. The tool of claim 5, wherein the second magnet is within the sheath.

* * * * *